United States Patent
Bhargava et al.

(10) Patent No.: US 9,834,695 B2
(45) Date of Patent: Dec. 5, 2017

(54) HIGH EFFICIENCY RHEOLOGY MODIFERS WITH CATIONIC COMPONENTS AND USE THEREOF

(71) Applicant: HERCULES INCORPORATED, Wilmington, DE (US)

(72) Inventors: Prachur Bhargava, Lafayette Hill, PA (US); Jeffrey K. Politis, Arden (DE)

(73) Assignee: HERCULES LLC, Wilmington, DE (US)

( * ) Notice: Subject to any disclaimer, the term of this patent is extended or adjusted under 35 U.S.C. 154(b) by 0 days.

(21) Appl. No.: 14/506,237

(22) Filed: Oct. 3, 2014

(65) Prior Publication Data

US 2015/0105500 A1 Apr. 16, 2015

Related U.S. Application Data

(60) Provisional application No. 61/889,695, filed on Oct. 11, 2013.

(51) Int. Cl.
| | |
|---|---|
| *C08K 5/1545* | (2006.01) |
| *C08L 13/02* | (2006.01) |
| *C09D 101/28* | (2006.01) |
| *C09D 125/14* | (2006.01) |
| *C09D 133/06* | (2006.01) |
| *C09D 101/00* | (2006.01) |
| *C09D 105/00* | (2006.01) |
| *C09D 133/26* | (2006.01) |
| *C09D 139/06* | (2006.01) |

(52) U.S. Cl.
CPC ....... *C09D 101/284* (2013.01); *C09D 101/00* (2013.01); *C09D 105/00* (2013.01); *C09D 125/14* (2013.01); *C09D 133/06* (2013.01); *C09D 133/26* (2013.01); *C09D 139/06* (2013.01); *C08L 2201/54* (2013.01)

(58) Field of Classification Search
CPC ...... C09D 101/28; C08K 5/1545; C08L 13/02
USPC .......................................... 524/44
See application file for complete search history.

(56) References Cited

U.S. PATENT DOCUMENTS

| | | | |
|---|---|---|---|
| 6,359,040 B1 | 3/2002 | Burdick | |
| 6,531,593 B1* | 3/2003 | Luo | ............ C08B 3/00 536/30 |
| 8,247,507 B2 | 8/2012 | Garcia Castro et al. | |
| 2005/0014882 A1 | 1/2005 | Brungardt et al. | |
| 2007/0054828 A1 | 3/2007 | Gentschev et al. | |
| 2007/0290160 A1* | 12/2007 | Koyanagi | ........... C04B 20/1018 252/1 |
| 2009/0036571 A1* | 2/2009 | Friedrich | .............. C08F 220/58 524/2 |
| 2011/0002868 A1* | 1/2011 | Bierganns | .............. A61K 8/737 424/70.13 |
| 2012/0247367 A1 | 10/2012 | Bhargava et al. | |
| 2013/0129657 A1 | 5/2013 | Streuli | |

FOREIGN PATENT DOCUMENTS

| | | |
|---|---|---|
| EP | 0322234 A2 | 6/1989 |
| EP | 0322234 B1 | 12/1993 |
| EP | 1505089 B1 | 1/2006 |
| WO | 2010078959 A1 | 7/2010 |

OTHER PUBLICATIONS

References cited on the International Search Report of PCT/US2014/059079 dated on Mar. 20, 2015.

* cited by examiner

*Primary Examiner* — Deve E Valdez
(74) *Attorney, Agent, or Firm* — Dunlap Codding, P.C.; Shaorong Chen

(57) ABSTRACT

The presently disclosed claimed inventive concept(s) relates generally to a rheology modifier composition and an aqueous protective coating composition containing the rheology modifier composition. More particularly, the presently disclosed and/or claimed inventive concept(s) relates to a rheology modifier composition comprising (a) about 50 to about 99% by weight of a water soluble polymer and about 1 to about 50% by weight of a cationic polymer, wherein the cationic polymer is produced by polymerizing a quaternized monomer or by polymerizing a quaternized monomer and a non-quaternized monomer. Additionally, the presently disclosed and/or claimed inventive concept(s) relates generally to the methods of making the rheology modifier composition and the aqueous protective coating composition.

18 Claims, No Drawings

HIGH EFFICIENCY RHEOLOGY MODIFERS WITH CATIONIC COMPONENTS AND USE THEREOF

CROSS REFERENCE TO RELATED APPLICATIONS

The present application claims the benefit under 35 U.S.C. 119 (e) of U.S. Provisional Patent Application Ser. No. 61/889,695, filed on Oct. 11, 2013, the entire contents of which are hereby expressly incorporated herein by reference.

BACKGROUND

1. Field of the Invention

The presently disclosed and/or claimed inventive process(es), procedure(s), method(s), product(s), result(s), and/or concept(s) (collectively hereinafter referred to as the "presently disclosed and/or claimed inventive concept(s)") relates generally to a rheology modifier composition and an aqueous protective coating composition containing the rheology modifier composition. More particularly, but not by way of limitation, the presently disclosed and/or claimed inventive concept(s) relates to a rheology modifier composition comprising about 50 to about 99% by weight of a water soluble polymer and about 1 to about 50% by weight of a cationic polymer, wherein the cationic polymer is produced by polymerizing a quaternized monomer or by copolymerizing a quaternized monomer and a non-quaternized monomer. Additionally, the presently disclosed and/or claimed inventive concept(s) relates generally to methods of making the rheology modifier composition and the aqueous protective coating composition.

2. Background of the Invention

Cellulose ethers and synthetic thickeners are utilized in architectural coatings to provide rheology to the paint. Cellulose ethers function by water phase thickening and have relatively high dosage requirements versus synthetic thickeners which provide the rheology by hydrophobic association. Increasing efficiency of cellulosic thickeners requires increasing the molecular weight of the cellulose ether which requires utilizing higher molecular weight cellulose furnishes. Additionally cellulose thickeners are in general deficient in providing high shear viscosity.

There is a need for a modified cellulose ether rheology that can be used to improve paint thickening efficiency (both low shear and high shear) of relatively low molecular weight cellulose ether without necessarily increasing the aqueous viscosity. The paint thickened with composition exhibit good dilution tolerance.

DETAILED DESCRIPTION OF THE INVENTIVE CONCEPT(S)

Before explaining at least one embodiment of the presently disclosed and/or claimed inventive concept(s) in detail, it is to be understood that the presently disclosed and/or claimed inventive concept(s) is not limited in its application to the details of construction and the arrangement of the components or steps or methodologies set forth in the following description or illustrated in the drawings. The presently disclosed and/or claimed inventive concept(s) is capable of other embodiments or of being practiced or carried out in various ways. Also, it is to be understood that the phraseology and terminology employed herein is for the purpose of description and should not be regarded as limiting.

Unless otherwise defined herein, technical terms used in connection with the presently disclosed and/or claimed inventive concept(s) shall have the meanings that are commonly understood by those of ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which the presently disclosed and/or claimed inventive concept(s) pertains. All patents, published patent applications, and non-patent publications referenced in any portion of this application are herein expressly incorporated by reference in their entirety to the same extent as if each individual patent or publication was specifically and individually indicated to be incorporated by reference.

All of the articles and/or methods disclosed herein can be made and executed without undue experimentation in light of the present disclosure. While the articles and methods of the presently disclosed and/or claimed inventive concept(s) have been described in terms of preferred embodiments, it will be apparent to those of ordinary skill in the art that variations may be applied to the articles and/or methods and in the steps or in the sequence of steps of the method described herein without departing from the concept, spirit and scope of the presently disclosed and/or claimed inventive concept(s). All such similar substitutes and modifications apparent to those skilled in the art are deemed to be within the spirit, scope and concept of the presently disclosed and/or claimed inventive concept(s).

As utilized in accordance with the present disclosure, the following terms, unless otherwise indicated, shall be understood to have the following meanings.

The use of the word "a" or "an" when used in conjunction with the term "comprising" may mean "one," but it is also consistent with the meaning of "one or more," "at least one," and "one or more than one." The use of the term "or" is used to mean "and/or" unless explicitly indicated to refer to alternatives only if the alternatives are mutually exclusive, although the disclosure supports a definition that refers to only alternatives and "and/or." Throughout this application, the term "about" is used to indicate that a value includes the inherent variation of error for the quantifying device, the method being employed to determine the value, or the variation that exists among the study subjects. For example, but not by way of limitation, when the term "about" is utilized, the designated value may vary by plus or minus twelve percent, or eleven percent, or ten percent, or nine percent, or eight percent, or seven percent, or six percent, or five percent, or four percent, or three percent, or two percent, or one percent. The use of the term "at least one" will be understood to include one as well as any quantity more than one, including but not limited to, 1, 2, 3, 4, 5, 10, 15, 20, 30, 40, 50, 100, etc. The term "at least one" may extend up to 100 or 1000 or more depending on the term to which it is attached. In addition, the quantities of 100/1000 are not to be considered limiting as lower or higher limits may also produce satisfactory results. In addition, the use of the term "at least one of X, Y, and Z" will be understood to include X alone, Y alone, and Z alone, as well as any combination of X, Y, and Z. The use of ordinal number terminology (i.e., "first", "second", "third", "fourth", etc.) is solely for the purpose of differentiating between two or more items and, unless otherwise stated, is not meant to imply any sequence or order or importance to one item over another or any order of addition.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. The term "or combinations thereof" as used herein refers to all permutations and combinations of the listed items preceding the term. For example, "A, B, C, or combinations thereof" is intended to include at least one of: A, B, C, AB, AC, BC, or ABC and, if order is important in a particular context, also BA, CA, CB, CBA, BCA, ACB, BAC, or CAB. Continuing with this example, expressly included are combinations that contain repeats of one or more item or term, such as BB, AAA, MB, BBC, AAAB-CCCC, CBBAAA, CABABB, and so forth. The skilled artisan will understand that typically there is no limit on the number of items or terms in any combination, unless otherwise apparent from the context.

A rheology modifier composition of the presently disclosed and/or claimed inventive concept(s) generally comprises, consists of, or consists essentially of about 50 to about 99% by weight of a water soluble polymer and about 1 to about 50% by weight of a cationic polymer. In one non-limiting embodiment, a rheology modifier composition of the presently disclosed and/or claimed inventive concept(s) generally comprises, consists of, or consists essentially of about 70 to about 98% by weight of a water soluble polymer and about 2 to about 30% by weight of a cationic polymer. In another non-limiting embodiment, a rheology modifier composition of the presently disclosed and/or claimed inventive concept(s) generally comprises, consists of, or consists essentially of about 85 to about 95% by weight of a water soluble polymer and about 5 to about 15% by weight of a cationic polymer.

In one aspect, the cationic polymer can be produced by polymerizing a quaternized monomer. In another aspect, the cationic polymer can be produced by copolymerizing a quaternized monomer and a non-quaternized monomer.

The quaternized monomer has the Formula (I):

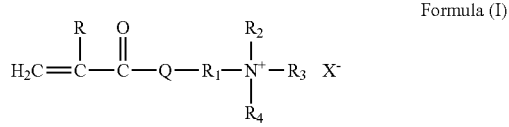

Formula (I)

wherein R is hydrogen or methyl, Q is NH or P, $R_1$ is alkyl $C_2$-$C_6$, $R_2$-$R_4$ are each individually alkyl $C_1$-$C_6$, and X is a halogen or sulfonate.

Examples of the quaternized monomers of formula (I) can include, but are not limited to, acryloxyethyltriethylammonium chloride, methacryloxyethyltrimethylammonium chloride, acrylamidopropyltrimethylammonium chloride, and methyacrylamidopropyltrimethylammonium chloride.

The quaternized monomer has the Formula (II):

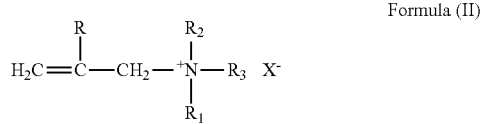

Formula (II)

wherein R is hydrogen or alkyl $C_1$-$C_6$; $R_1$ is hydrogen, alkyl $C_1$-$C_6$, allyl or aryl; $R_2$ and $R_3$ are individually hydrogen, alky $C_1$-$C_6$, allyl or aryl; and X is halogen or sulfonate.

Examples of the quaternized monomers of formula (II) can include, but are not limited to, diallyldialkylammonium salt. In one non-limiting embodiment, the diallyldialkylammonium salt is diallyldimethylammonium chloride.

The quaternized monomer has the Formula (III):

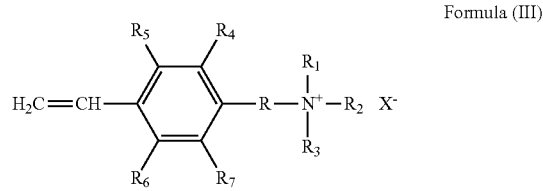

Formula (III)

wherein R is alkyl $C_1$-$C_6$, $R_1$-$R_3$ are each individually alkyl $C_1$-$C_6$, $R_4$-$R_7$ are each individually hydrogen or alkyl $C_1$-$C_6$, and X is halogen or sulfonate.

Examples of the quaternized monomers of formula (III) can include, but are not limited to, vinylbenzyl ammonium salt. In one non-limiting embodiment, the vinylbenzyl ammonium salt is vinylbenzyl trimethyl ammonium chloride The quaternized monomer has the Formula (IV):

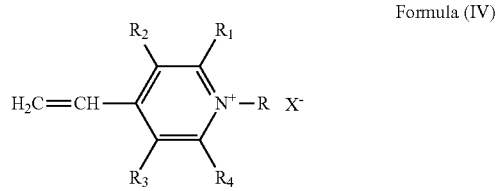

Formula (IV)

wherein R is alkyl $C_1$-$C_6$, $R_1$-$R_4$ are each individually hydrogen or alkyl $C_1$-$C_6$, and X is halogen or sulfonate.

Examples of the quaternized monomers of formula (IV) can include, but are not limited to, 1-ethyl-4-vinylpyridinium chloride, 1-ethyl-4-vinylpyridinium bromide, and 1-ethyl-4-vinylpyridinium methyl sulfonate.

The quaternized monomer has the Formula (V):

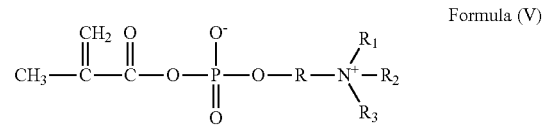

Formula (V)

wherein R is alkyl $C_1$-$C_6$, and $R_1$-$R_3$ are each individually alkyl $C_1$-$C_4$.

The quaternized monomer has the Formula (VI):

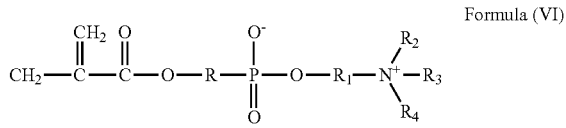

Formula (VI)

wherein R and $R_1$ are each individually alkyl $C_2$-$C_6$, and $R_2$-$R_4$ are each individually alkyl $C_1$-$C_6$.

Examples of the quaternized monomers of formula (VI) can include, but are not limited to, polyquaternium 51, polyquaternium 61 and polyquaternium 64.

The quaternized monomer has the Formula (VII):

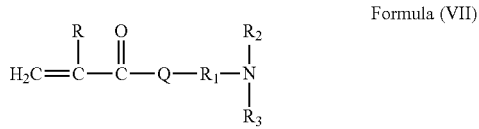

Formula (VII)

wherein R is hydrogen or methyl, Q is NH or O, $R_1$ is alkyl $C_2$-$C_6$, and $R_2$ and $R_3$ are each individually alkyl $C_1$-$C_6$.

Examples of the quaternized monomers of formula (VII) can include, but are not limited to, dimethylaminopropyl methacrylamide and dimethylaminoethyl methacrylamide.

The quaternized monomer has the Formula (VIII):

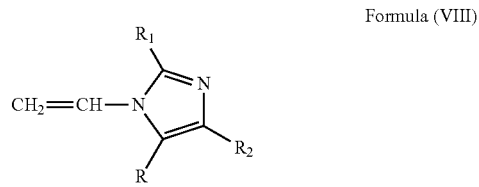

Formula (VIII)

wherein R, $R_1$, and $R_2$ are each individually hydrogen or alkyl $C_1$-$C_6$.

Examples of the quaternized monomers of formula (VIII) can include, but are not limited to, 1-vinylimidazole.

The quaternized monomer has the Formula (IX):

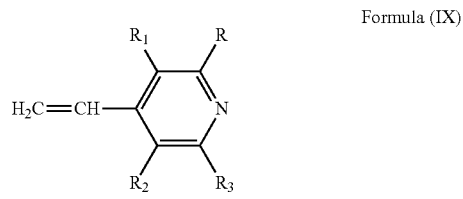

Formula (IX)

wherein R, $R_1$, $R_2$ and $R_3$ are each individually hydrogen or alkyl $C_1$-$C_6$.

Examples of the quaternized monomers of formula (VIII) can include, but are not limited to, 4-viylpyridine.

The non-quaternized monomer is selected from the group consisting of acrylate monomer, acrylamide monomer, styrene monomer, and vinyl pyrrolidone monomer.

The water soluble polymer can be polyacrylamides, polyacrylamide derivatives, polyvinylpyrrolidones, polyvinylpyrrolidone derivatives, guar gums, guar gum derivatives, celluloses and cellulose derivatives. In one non-limiting embodiment, the water soluble polymer is cellulose ether.

The cellulose ethers for use in the presently disclosed and claimed inventive concept(s) can include cellulose ethers. These can include, but are not limited to, hydroxyethyl cellulose (HEC), hydroxypropyl cellulose (HPC), water soluble ethylhydroxyethyl cellulose (EHEC), carboxymethyl cellulose (CMC), carboxymethylhydroxyethyl cellulose (CMHEC), hydroxypropylhydroxyethyl cellulose (HPHEC), methylcellulose (MC), methylhydroxypropyl cellulose (MHPC), methylhydroxyethyl cellulose (MHEC), carboxymethylmethyl cellulose (CMMC), hydrophobically modified carboxymethyl cellulose (HMCMC), hydrophobically modified hydroxyethyl cellulose (HMHEC), hydrophobically modified hydroxylpropyl cellulose (HMHPC), hydrophobically modified ethylhydroxyethyl cellulose (HMEHEC), hydrophobically modified carboxymethylhydroxyethyl cellulose (HMCMHEC), hydrophobically modified hydroxypropylhydroxyethyl cellulose (HMHPHEC), hydrophobically modified methyl cellulose (HMMC), hydrophobically modified methylhydroxypropyl cellulose (HMMHPC), hydrophobically modified methylhydroxyethyl cellulose (HMMHEC), hydrophobically modified carboxymethylmethyl cellulose (HMCMMC), cationic hydroxyethyl cellulose (cationic HEC) and cationic hydrophobically modified hydroxyethyl cellulose (cationic HMHEC). In one non-limiting embodiment, the cellulose ether is HEC.

The cellulose ether can be treated with small amounts of a cross-linker. The cross-linking can be carried out under conditions such that only a slight amount of formation of cross-linkages takes place, according to the method set forth in U.S. Pat. No. 2,879,268, the disclosure of which is incorporated herein by reference in its entirety. The concentration of the cross-linker in the cellulose ether powder is up to about 8% by weight, preferably between about 0.01 to 5% by weight.

The cross-linker can be a multifunctional molecule having at least first and second reactive moieties. At least one of the first reactive moieties is an aldehyde which can react with the pendent hydroxyl group of the cellulose ether to form a hemiacetal bond. The second reactive moiety can be a wide variety of different groups that can react with the cellulose ether, preferably the pendent hydroxyl group of the cellulose ether. These reactive groups include carboxyls, silanols, isocyanates, halomethyl, alkyl tosylate ether, and epoxide. The cross-linker may be a dialdehyde such as glyoxal. Glyoxalated cellulose ethers are commercially available.

The amounts of the cross-linker can be varied from about 0.1% to about 8% by weight of the rheology modifier composition. In one non-limiting embodiment, the amounts of the cross-linker can be varied from about 1.0% to about 5% by weight of the rheology modifier composition.

The rheology modifier composition can further include a dispersant. The dispersant is selected from the group consisting of polycarboxylic acids, carboxylated polyelectrolyte salts, tipolyphosphate salts and tetrapotassium pyrophosphate, ethoxylated fatty alcohols, amino alcohols, acrylic copolymers, naphthalene sulfonic acid-formaldehyde adducts, sulfonated fatty acids, and combinations thereof.

An aqueous protective coating composition comprises the rheology modifier composition described above. In addition, the aqueous protective coating composition further comprises a water-insoluble latex polymer as film former (also referred to as a binder), pigment, and water. In addition, the aqueous protective coating composition may contain other functional additives, for example, but not by way of limitation, defoamers (e.g., nonsilicone and silicone types), surfactants, biocides/preservatives, coalescing agents (high-boiling organic solvents), plasticizers, stabilizers, viscosifiers, leveling aids, defoamers, anti-skinning agents, extenders, cross-linkers, corrosion inhibitors, surface improvers, matting agents, humectants/wet-edge agents (e.g., ethylene glycol, propylene glycol, and hexylene glycol), coalescing agents (e.g. glycol ethers/esters and surface-active agents), pH modifiers, and colorants, etc.

A wide variety of latex polymers can be used in the aqueous protective coating composition of the presently disclosed and/or claimed inventive concept(s). They can be made by polymerization of various ethylenically unsaturated monomers, such as ethylene, vinyl, and acrylic monomers. Oftentimes, latex polymers are made by copolymerizing more than one monomer to achieve several desired properties, particularly for applications in latex paints with very little or no volatile organic compounds (VOCs). Examples of synthetic polymeric latexes used in the aqueous protective coating composition can include, but are not limited to, homo- or co-polymers of vinyl acetate, methacrylic acid, methylacrylate, methylmethacrylate, ethylacrylate, butyl acrylate, styrene, ethylene, vinyl chloride, vinyl ester of versatic acid (VeoVa), vinyl propionate, butadiene, acrylonitrile, maleates, and fumarates. In one non-limiting embodiment, the latex polymer is selected from the group consisting of acrylics, vinyl-acrylics and styrene-acrylics.

Other latex polymers can include, but are not limited to, alkyds, cellulosics (cellulose nitrate and cellulose esters), coumarone-indenes, epoxies, esters, hydrocarbons, melamines, natural resins, oleo resins, phenolics, polyamides, polyesters, rosins, silicones, terpenes, ureas, urethanes, vinyls, and the like.

In one non-limiting embodiment, the pigment is selected from the group consisting of hydrated aluminum oxide, barium sulfate, calcium silicate, lay, silica, talc, titanium dioxide, zinc oxide, magnesium aluminum silicate, and mixtures thereof. Oftentimes, titanium dioxide grades used in the aqueous protective coating composition are surface modified with various inorganic oxides, such as silicates, aluminates, and zirconates. Aluminum silicate, nepeline syenite, mica, calcium carbonate, and/or diatomaceous earth can also be employed.

For colored coatings, desired colorants can be added to the aqueous protective coating composition. The colored species can be metallic oxides, such as iron or chromium oxide or synthetic organic pigments. Carbon black can also be used as a colorant to tailor the color of coating.

The type and amount of pigment present in aqueous protective coating composition dictate the performance properties, such as gloss, permeability, scrub resistance, tensile strength, etc. of the dried film. Hence, coatings are characterized by their pigment volume concentration (PVC). The PVC is a percentage and represents a volume ratio of pigment to total solids present in the dried film. PVC is defined as:

$$PVC\% = \frac{\text{Pigment Volume}}{\text{Pigment Volume} + \text{Latex Volume}} \times 100$$

The point at which all voids between pigment particles are just filled with the latex binder is called the critical pigment-volume concentration (CPVC).

The aqueous protective coating composition has a PVC upper limit of about 85% by weight. In one non-limiting embodiment, the aqueous protective coating composition has a PVC upper limit of about 75% by weight. In another non-limiting embodiment, the aqueous protective coating has a PVC upper limit of about 65% by weight.

The aqueous protective coating composition has a PVC lower limit of about 10% by weight. In another non-limiting embodiment, the aqueous protective coating composition has a PVC lower limit of about 20% by weight. More particularly, when the latex paint is high gloss paint, the PVC is from about 15% to about 30% by weight; when the paint is a semi-gloss paint, the PVC is from about 20% to about 35% by weight; and when it is a flat paint, the PVC is from about 40% to about 85% by weight.

The amount of the rheology modifier composition used in the aqueous protective coating composition of the presently disclosed and/or claimed inventive concept(s) is the amount effective in providing the desired thickening and rheological properties to the coating composition and thus will depend upon both the rheological properties desired and the dispersion employed. In one non-limiting embodiment, the minimum amount is about 0.01 wt % of the wet coating composition. In another non-limiting embodiment, the minimum is about 0.05 wt % of the wet coating composition. In one non-limiting embodiment, the maximum amount is about 10 wt % of the wet coating composition. In another non-limiting embodiment, the maximum amount about 5 wt % of the wet coating composition.

The aqueous protective coating composition may optionally contain other components such as those generally used in such compositions. Typical components include, but are not limited to, one or more of the following: solvents, fillers, dryers, flattening agents, plasticizers, stabilizers, dispersants, surfactants, viscosifiers, suspension agents, flow control agents, defoamers, anti-skinning agents, biocides/preservatives (e.g., non-mercurial type), extenders, filming aids, cross-linkers, surface improvers, corrosion inhibitors, and other ingredients useful in aqueous protective coating compositions.

The presently disclosed and/or claimed inventive concept(s) further relates to a method of incorporating the rheology modifier composition of the presently disclosed and/or claimed inventive concept(s) into an aqueous protective coating formulation, which is to simply add the rheology modified composition to a coating formulation under agitation.

The following examples illustrate the presently disclosed and/or claimed inventive concept(s), parts and percentages being by weight, unless otherwise indicated. Each example is provided by way of explanation of the presently disclosed and/or claimed inventive concept(s), not limitation of the presently disclosed and/or claimed inventive concept(s). In fact, it will be apparent to those skilled in the art that various modifications and variations can be made in the presently disclosed and/or claimed inventive concept(s) without departing from the scope or spirit of the invention. For instance, features illustrated or described as part of one embodiment, can be used on another embodiment to yield a still further embodiment. Thus, it is intended that the presently disclosed and/or claimed inventive concept(s) covers such modifications and variations as come within the scope of the appended claims and their equivalents.

EXAMPLES

Example 1—Poly APTAC and Polyacrylamide Copolymer Blended with Hydrophobically Modified Hydroxyethyl Cellulose and Added to 70PVC Styrene Acrylic Paint Hydrophobically modified hydroxyl ethyl cellulose (Natrosol™ Plus 330 or Natrosol™ HE3 KB, available from Ashland Inc.) was mixed with different levels of Nhance™ SP 100 (available from Ashland Inc.), as shown in Table 1 to form blends. These blends were added (as a solution) to 70PVC styrene acrylic base paint (formulation in Table 2). The resulting KU (Krebs Units) and ICI viscosity data corresponding to the blend is shown in Table 1. ICI viscosity was the viscosity at a shear rate of 10,000 $S^{-1}$. Both KU viscosity and ICI viscosity are increased upon addition of Nhance™ SP100.

TABLE 1

| Sample No. | Thickener | SP100***, wt % in Blend | Blend Dosage in Paint, wt % | Stormer Initial/24 hrs [KU] | ICI |
|---|---|---|---|---|---|
| 1 | HE3KB* | 0 | 0.52 | 102 | 0.58 P |
| 2 | HE3KB | 2.5 | 0.52 | 116 | 0.68 P |
| 3 | HE3KB | 5 | 0.52 | 121 | 0.73 P |
| 4 | HE3KB | 10 | 0.52 | >140 | 0.89 P |
| 5 | Plus 330** | 0 | 0.52 | 93 | 0.54 P |
| 6 | Plus 330 | 2.5 | 0.52 | 100 | 0.58 P |
| 7 | Plus 330 | 5 | 0.52 | 111 | 0.70 P |
| 8 | Plus 330 | 10 | 0.52 | >140 | 0.75 P |

*Natrosol™ HE3KB
**Natrosol™ Plus 330
***Nhance™ SP 100

TABLE 2

70PVC Styrene Acrylic Base Paint

| Ingredients | Amounts, g | Wt % |
|---|---|---|
| Water | 133 | 13.3 |
| Ethylene glycol | 5 | 0.5 |
| Proxel™ GXL[(1)] | 1 | 0.1 |
| Tamol™ 1254[(2)] | 5 | 0.5 |
| Triton™ CF-10[(3)] | 2 | 0.2 |
| Advantage™ AM1512[(4)] | 2 | 0.2 |
| pHLEX™ 110[(5)] | 1 | 0.1 |
| Ti Pure® R-706[(6)] | 90 | 9 |
| Satintone® W[(7)] | 106 | 10.6 |
| Omyacarb® 10-LU[(8)] | 278 | 27.8 |
| Texanol™ Ester Alcohol[(9)] | 10 | 1 |
| Acronal® 296D[(10)] | 149 | 14.9 |
| Advantage™ AM1512 | 1 | 0.1 |
| Water | 32 | 3.2 |
| | | |
| Total (w/o HEC) | 815 | 81.5 |
| PVC | 70.1 | 7.01 |
| Non Volatile Weight (NVW) | 54.9 | 5.49 |
| Water | 185 | 18.5 |

[(1)]An aqueous solution of 1,2-benzisothiazolin-3-one, commercially available from Arch Chemicals, Inc.
[(2)]A polyacid dispersant, commercially available from The Dow Chemical Company.
[(3)]A nonionic surfactant, commercially available from The Dow Chemical Company.
[(4)]An antifoaming agent, commercially available from Ashland Inc.
[(5)]A neutralizing agent, commercially available from Ashland Inc.
[(6)]TiO$_2$, commercially available from DuPont.
[(7)]Calcined kaolin, commercially available from BASF.
[(8)]Calcium carbonate, commercially available from Omya.
[(9)]Coalescent, commercially available from Eastman Chemical Company.
[(10)]Aqueous styrene-acrylate copolymer dispersion, commercially available from BASF.

Example 2—Poly APTAC and Polyacrylamide Copolymer Blended with Methyl Hydroxyl Ethyl Cellulose and Added to 70PVC Styrene Acrylic Based Paint Methyl hydroxyethyl cellulose (Culminal™ MHEC15000 PFR or Culminal™ MHEC 35000PFR, available from Ashland Inc.) was mixed with Nhance™ SP 100 as shown in Table 3 to form blends. These blends were added (as a solution) to 70PVC styrene acrylic base paint (formulation shown in Table 2). The resulting KU (Krebs Units) and ICI viscosity data using these blends are shown in Table 3. ICI viscosity was the viscosity at a shear rate of 10,000 $S^{-1}$. Both KU viscosity and ICI viscosity are increased upon addition of Nhance™ SP100.

TABLE 3

| Sample No. | Thickener | SP100*, wt % in Blend | Blend Dosage in Paint, wt % | Stormer Initial/ 24 hrs [KU] | ICI |
|---|---|---|---|---|---|
| 9 | MHEC15000PFR** | 0 | 0.40% | 102.6 | 1.077P |
| 10 | MHEC 15000PFR | 10 | 0.40% | 126.3 | 1.279P |
| 11 | MHEC 35000 PFR*** | 0 | 0.40% | 117.1 | 0.960P |
| 12 | MHEC 35000 PFR | 10 | 0.40% | 131.6 | 1.223P |

*Nhance™ SP 100
**Culminal™ MHEC15000 PFR
***Culminal™ MHEC15000 PFR

Example 3—Poly APTAC and Polyacrylamide Copolymer Blended with a Hydroxyl Ethyl Cellulose and Added to 58PVC ALL Acrylic Paint Hydroxy ethyl cellulose (Natrosol™ 250HBR, available from Ashland Inc.) was mixed with a copolymer of acrylamide and APTAC (acrylamido propyl trimonium chloride) (Praestol® 644BC, available from Demols Inc.) to form blends. The blends was added (as a solution) to 58PVC all acrylic paint (formulation in Table 5). The resulting KU (Krebs Units), ICI viscosity and Brookfield viscosity data are shown below in Table 4. ICI viscosity was the viscosity at a shear rate of 10,000 $S^{-1}$. The presence of the copolymer improves the KU, Brookfield viscosity and ICI viscosity. The Brookfield viscosity was measured using a Brookfield RVT viscometer using spindle 5 and 20 rpm.

TABLE 4

| Thickener | Praestol® 644 BC wt % | Blend Dosage in Paint, wt % | Stormer Initial/ 24 hrs [KU] | Brookfield | ICI |
|---|---|---|---|---|---|
| Natrosol™ 250HBR | 0 | 0.40% | 116 | 13000 | 0.75 P |
| Natrosol™ 250HBR | 10 | 0.40% | 123 | 15200 | 1.05 P |

TABLE 5

58PVC All Acrylic Paint

| Ingredient | Wt % |
|---|---|
| Water | 17.00 |
| Strodex™ TH 100[(1)] | 0.40 |
| Dispex® N40[(2)] | 0.60 |

TABLE 5-continued

58PVC All Acrylic Paint

| Ingredient | Wt % |
| --- | --- |
| Parmetol ® A28S[3] | 0.25 |
| Drewplus ™ T 4507[4] | 0.20 |
| Ti Pure ® R-931[5] | 16.00 |
| English China Clay Speshwhite (0.7μ)[6] | 5.00 |
| China Clay Supreme (0.4μ)[7] | 5.00 |
| Omyacarb ® 5 GU[8] | 11.00 |
| Plustalc H15-AW[9] | 10.00 |
| Texanol ™ Ester Alcohol | 0.40 |
| pHLEX ™ 410[10] | 0.20 |
| Primal HG 74 D[11] | 22.00 |
| Drewplus ™ T 4507 | 0.20 |
| Water | 11.35 |

[1] A surfactant, commercially available from Ashland Inc.
[2] Sodium salt of an acrylic polymer, commercially available from BASF.
[3] A water based combination of chloromethyl-/methylisothiazolone (CMI/MI) and bromopol, commercially available from Schülke&Mayr GmbH.
[4] A foam control agent, commercially available from Ashland Inc.
[5] TiO$_2$, commercially available from DuPont.
[6] Refined kaolin with ultrafine particle size, commercially available from Richard Baker Harrison Ltd., UK.
[7] Hydrated alumina silicate, commercially available from Imerys.
[8] Calcium carbonate, commercially available from Omya.
[9] Talc (Mg-silicate), commercially available from Mondo Minerals B.V., The Netherlands.
[10] A neutralizing agent, commercially available from Ashland Inc.
[11] Styrene acrylic latex, commercially available from The Dow Chemical Company.

Example 4—Styleze® W 20 and Hydroxy Ethyl Cellulose Added to Paint

A 20 wt % solution of a copolymer P(VP/DMAPMA/MAPLDMAC) N,N-Dimethyl-N-[3-(2-methyl-2-propenoyl)aminopropyl]-1-dodecanaminium chloride (polymer with N-(3-dimethylaminopropyl)-2-methyl-2-propenamide and 1-ethenyl-2-pyrrolidinone, Styleze® W 20 available from Ashland Inc.) and Natrosol™ 250HBR were added to 70PVC styrene acrylic base paint (formulation in Table 2). The total active weight % of Styleze®W20 and Natrosol™250HBR was 0.5 wt, % of the paint with the ratio of Styleze® W20 and Natrosol™250HBR being 15:85. As a control only Natrosol™250HBR was added to the paint at a concentration of 0.5 wt %. The comparative KU (Krebs Units) and ICI viscosity are given below in Table 6. ICI viscosity was the viscosity at a shear rate of 10,000 S$^{-1}$. Both are increased in case of paint to which Styleze® W 20 is added.

TABLE 6

| Rheology Modifier | Total wt % | Stormer Initial/24 hrs [KU] | ICI |
| --- | --- | --- | --- |
| Natrosol ™ 250HBR | 0.5 | 108 | 0.72 P |
| Natrosol ™ 250HBR + Styleze ® W20 | 0.5 | 112 | 0.84 P |

Example 5—Polyethyleneimine and Hydroxy Ethyl Cellulose Added to Paint 50 wt % of polyethyleneimine in water solution and Natrosol™250HBR were added to 70PVC styrene acrylic base paint (formulation in Table 2). The total active weight % of polyethyleneimine and Natrosol™250HBR was 0.5 wt % of the paint with the ratio of polyethyleneimine and Natrosol™250HBR being 15:85. As a control only Natrosol™250HBR was added to the paint at a concentration of 0.5 wt %. The comparative KU (Krebs Units) and ICI viscosity are given below. ICI viscosity was the viscosity at a shear rate of 10,000 S$^{-1}$. Both are increased in case of paint to which polyethyleneimine is added.

TABLE 7

| Rheology Modifier | Total wt % | Stormer Initial/24 hrs [KU] | ICI |
| --- | --- | --- | --- |
| Natrosol ™ 250HBR | 0.5 | 108 | 0.76 P |
| Natrosol ™ 250HBR + Polyethyleneimine | 0.5 | 114 | 0.84 P |

Example 6—Poly APTAC and Polyacrylamide Copolymer and Hydroxyethyl Cellulose Added to 70PVC all Acrylic Paint Different amounts of Natrosol™ 250HBR and Praestol® 655 BC-K (Poly APTAC and Polyacrylamide Copolymer available from Ashland Inc.) were added (as a solution) to 70PVC all acrylic paint (formulation in Table 9). The resulting KU (Krebs Units) and ICI viscosity data are shown in Table 8. ICI viscosity was the viscosity at a shear rate of 10,000 S$^{-1}$. The presence of Praestol®655BC-K improves the KU and ICI viscosity.

TABLE 8

| Natrosol ™ 250 HBR, wt % | Praestol ® 655 BC-K, wt % | Wt % of blend in Paint | Stormer Initial/24 hrs [KU] | ICI |
| --- | --- | --- | --- | --- |
| 100 | 0 | 0.40 | 103.7 | 0.8 P |
| 85 | 15% | 0.40 | 119.0 | 1.3 P |
| 85 | 15% | 0.34 | 104.7 | 1.0 P |

TABLE 9

70 PVC All Acrylic Paint

| Ingredient | Wt % |
| --- | --- |
| Water | 20.59 |
| Strodex ™ TH 100 | 0.26 |
| Dispex ® N40 | 0.65 |
| Parmetol ® A28S | 0.16 |
| Drewplus ™ T 4507 | 0.13 |
| Ti Pure ® R-931 | 17.33 |
| English China Clay Speshwhite (0.7μ) | 5.42 |
| China Clay Supreme (0.4μ) | 5.42 |
| Omyacarb ® 5 GU | 11.91 |
| Plustalc H15 - AW | 10.83 |
| Texanol ™ Ester Alcohol | 0.26 |
| pHLEX ™ 410 | 0.13 |
| Primal HG 74 D | 14.10 |
| Drewplus ™ T 4507 | 0.13 |
| Water | 12.29 |

Example 7—T-Butylacrylate/Sodiumvinylsulfonate/AcrylamidePoly APTAC and Polyacrylamide Copolymer and Hydroxyethyl Cellulose Added to 48PVC all Acrylic Paint Various amounts of Natrosol™ 250HBR and Praestol® 655BC-K were added (as a solution) to 48PVC all acrylic base paint (formulation in Table 11). The resulting KU (Krebs Units) and ICI viscosity data are shown in Table 10. ICI viscosity was the viscosity at a shear rate of 10,000 S$^{-1}$. The presence of Praestol® 655BC-K improves KU and ICI viscosity.

TABLE 10

| Natrosol™ 250 HBR, wt % | Praestol® 655 BC-K, wt % | Wt % of blend in Paint | Stormer Initial/24 hrs [KU] | ICI |
|---|---|---|---|---|
| 100 | 0 | 0.40 | 113.0 | 0.75 P |
| 85% | 15% | 0.40 | 125.3 | 1.0 P |
| 85% | 15% | 0.32 | 113.2 | 0.9 P |

TABLE 11

48 PVC All acrylic Paint

| Ingredient | Wt % |
|---|---|
| Water | 13.35 |
| Strodex™ TH 100 | 0.55 |
| Dispex® N40 | 0.55 |
| Parmetol® A28S | 0.34 |
| Drewplus™ T 4507 | 0.27 |
| Ti Pure® R-931 | 14.63 |
| English China Clay Speshwhite (0.7 µ) | 4.57 |
| China Clay Supreme (0.4 µ) | 4.57 |
| Omyacarb® 5 GU | 10.06 |
| Plustalc H15 - AW | 9.14 |
| Texanol™ Ester Alcohol | 0.55 |
| pHLEX™ 410 | 0.27 |
| Primal HG 74 D | 30.11 |
| Drewplus™ T 4507 | 0.27 |
| Water | 10.38 |

Example 8—Poly APTAC and Polyacrylamide Copolymer and Hydrophobically Modified Hydroxyethyl Cellulose Added to 58PVC all Acrylic Paint Various amounts of Natrosol™ Plus 330 and Praestol® 655BC-K were added (as a solution) to 48PVC all acrylic paint (formulation in Table 11). The resulting KU (Krebs Units) and ICI viscosity data are shown in Table 12. ICI viscosity was the viscosity at a shear rate of 10,000 $S^{-1}$. The presence of Praestol® 655BC-K improves KU and ICI viscosity. In a follow up experiment the dosage of the blend (Natrosol™ Plus 330+Praestol® 655BC-K) was reduced to obtain similar KU as Natrosol™ Plus 330 alone. The dosage can be reduced by ~15% and the ICI viscosity obtained is still high.

TABLE 12

| Natrosol™ Plus 330, wt % | Praestol® 655 BC-K, wt % | Wt % of blend in Paint | Stormer Initial/24 hrs [KU] | ICI |
|---|---|---|---|---|
| 100 | 0 | 0.40 | 96.2 | 0.55 P |
| 85 | 15 | 0.40 | 103.6 | 0.70 P |
| 85 | 15 | 0.34 | 93.6 | 0.70 P |

Example 9—Poly APTAC and Polyacrylamide Copolymer and Hydroxyethyl Cellulose Added to 58PVC Styrene Acrylic Paint Various amounts of Natrosol™ 250HBR and Praestol® 655BC-K were added (as a solution) to 58PVC styrene acrylic base paint (formulation in Table 14). The resulting KU (Krebs Units) and ICI viscosity data are shown in Table 13. ICI viscosity was the viscosity at a shear rate of 10,000 $S^{-1}$.

TABLE 13

| Natrosol™ 250 HBR, wt % | Praestol® 655 BC-K, wt % | Wt % of blend in Paint | Stormer Initial/24 hrs [KU] | ICI |
|---|---|---|---|---|
| 100 | 0 | 0.40 | 110.6 | 1.10 P |
| 90 | 10 | 0.40 | 130.6 | 2.40 P |
| 90 | 10 | 0.29 | 109.7 | 1.40 P |

TABLE 14

58 PVC Styrene Acrylic Paint

| Ingredient | Wt % |
|---|---|
| Water | 17.00 |
| Strodex™ TH 100 | 0.40 |
| Dispex® N40 | 0.60 |
| Parmetol® A28S | 0.25 |
| Drewplus™ T 4507 | 0.20 |
| Ti Pure® R-931 | 16.00 |
| English China Clay Speshwhite (0.7µ) | 5.00 |
| China Clay Supreme (0.4µ) | 5.00 |
| Omyacarb® 5 GU | 11.00 |
| Plustalc H15 | 10.00 |
| Texanol™ Ester Alcohol | 0.40 |
| pHLEX™ 410 | 0.20 |
| Acronal® S559[(1)] | 22.00 |
| Drewplus™ T 4507 | 0.20 |
| Water | 11.35 |

[(1)]Styrene latex/acrylic latex, commercially available from BASF.

Example 10—Synthesis of Poly(Vinylpyrrolidone/ MethacrylOxyEthylTrimethylAmmonium Chloride (p(VP/MOETAC)) Copolymer 5578 g DI water, 101 g 1-vinyl-2-pyrrolidione (VP) and 60 g MOETAC (75 wt % active) (MHOROMER® BM 606, available from Evonik Industries) were charged into a reactor of 1-L four necked resin kettle equipped with a thermocouple, condenser, oil bath and nitrogen purge. The mixture was stirred at 250 rpm. The reactor was purged with nitrogen and the polymerization was carried out under nitrogen. Water circulating bath temperature was maintained at about 68° C. 0.21 g Trigonox® 25-C75 (available from AkzoNobel Polymer Chemicals) was charged and rinsed with 2 g DI water. The temperature was increased to about 63-66° C. and held for about 1 hour. 0.21 g Trigonox® 25C75 was charged and rinsed with 2 g DI water. The mixture was stirred for about 3 hours. The final product obtained had:

Solids=9.8 wt %,

Solids weight ratio of VP/MOETAC=69/31,

Solids mole ratio of VP/MOETAC=76/24.

Example 11—Poly(Vinylpyrrolidone/MethacrylOxyEthylTrimethylAmmonium Chloride)

P(VP/MOETAC) (prepared in Example 10) and Natrosol™ 250 HBR were added to 70PVC styrene acrylic base paint (in Table 2). The total active weight % of the P(VP/MOETAC) and Natrosol™ 250 HBR was 0.5 wt % of the paint with the ratio of P(VP/MOETAC) and Natrosol™ 250 HBR being 15:85. As a control only Natrosol™ 250HBR was added to the paint at a concentration of 0.5 wt %. The comparative KU (Krebs Units) and ICI viscosity are given below in Table 15. ICI viscosity was the viscosity at a shear rate of 10,000 $S^{-1}$.

TABLE 15

| Rheology Modifier | Total wt % | Stormer Initial/24 hrs [KU] | ICI |
|---|---|---|---|
| Natrosol ™ 250HBR | 0.5 | 106 | 0.77 P |
| Example 10 | 0.5 | 109 | 0.82 P |

Example 12—Synthesis of Poly(Vinylpyrrolidone/ MethacrylOxyEthylTrimethylAmmonium Chloride (p(VP/MOETAC)) with Cross-Linker 570 g DI water, 73 g 1-vinyl-2-pyrrolidone (VP) and 97 g MOETAC (75% active)(MHOROMER® BM 606, available from Evonik Industries) and 0.483 g PETE (Pentaerythritol triallylether) were charged into a reactor of 1-L four necked resin kettle equipped with a thermocouple, condenser, oil bath and nitrogen purge. The mixture was stirred at 200 rpm. The reactor was purged with nitrogen and the polymerization was carried out under nitrogen. Bath temperature for water circulation was maintained at about 68° C. Nitrogen was sparged for about 60 minutes. 0.21 g Trigonox® 25-C75 was charged and rinsed with 2 g DI water. The temperature was increased to about 63-66° C. and held for about 1 hour. 0.21 g Trigonox® 25-C75 was charged and rinsed with 2 g DI water. The mixture was stirred for about 3 hours. The final product obtained had:
Solids weight ratio of VP/MOETAC=50/50 with 0.3% PETE
Solids mole ratio of VP/MOETAC=65/35

Example 13—Poly(Vinylpyrrolidone/MethacrylOxyEthylTrimethylAmmonium Chloride

P(VP/MOETAC) (prepared in Example 12) and Natrosol™ 250 HBR were added to 70PVC styrene acrylic based paint (Table 2). The total active weight % of the P(VP/MOETAC) and Natrosol™ 250 HBR was 0.5 wt % of the paint with the ratio of P(VP/MOETAC) and Natrosol™ 250 HBR being 15:85. As a control only Natrosol™ 250 HBR was added to the paint at a concentration of 0.5 wt %. The comparative KU (Krebs Units) and ICI viscosity are given below in Table 16. ICI viscosity was the viscosity at a shear rate of 10,000 S$^{-1}$.

TABLE 16

| Rheology Modifier | Total wt % | Stormer Initial/24 hrs [KU] | ICI |
|---|---|---|---|
| Natrosol ™ 250HBR | 0.5 | 106 | 0.77 P |
| Example 12 | 0.5 | 109 | 0.76 P |

Example 14—Synthesis of Poly(Vinylpyrrolidone/ MethacrylOxyEthylTrimethylAmmonium Chloride (p(VP/MOETAC))

570 g DI water, 73 g 1-vinyl-2-pyrrolidone (VP), 97 g MOETAC (75% active)(MHOROMER® BM 606) and 0.876 g PETE (Pentaerythritol triallylether) were charged into a reactor of 1-L four necked resin kettle equipped with a thermocouple, condenser, oil bath and nitrogen purge. The mixture was stirred at 200 rpm. The reactor was purged with nitrogen and the polymerization was carried out under nitrogen. Bath temperature for water circulation was maintained at about 68° C. Nitrogen was sparged for about 60 minutes. 0.21 g Trigonox® 25-C75 was charged and rinsed with 2 g DI water. The temperature was increased to about 63-66° C. and held for about 1 hour. 0.21 g Trigonox® 25-C75 was charged and rinsed with 2 g DI water. The mixture was stirred for about 3 hours. The final product obtained had:
Solids weight ratio of VP/MOETAC=50/50 with 0.6% PETE,
Solids mole ratio of VP/MOETAC=65/35.

Example 15—Poly(Vinylpyrrolidone/MethacrylOxyEthylTrimethylAmmonium Chloride

P(VP/MOETAC) (prepared in Example 14) and Natrosol™ 250 HBR were added to 70PVC styrene acrylic base paint (Table 2). The total active weight % of the P(VP/MOETAC) and Natrosol™ 250 HBR was 0.5 wt % of the paint with the ratio of P(VP/MOETAC) and Natrosol™250 HBR being 15:85. As a control only Natrosol™ 250 HBR was added to the paint at a concentration of 0.5 wt %. The comparative KU (Krebs Units) and ICI viscosity are given below in Table 17. ICI viscosity was the viscosity at a shear rate of 10,000 S$^{-1}$.

TABLE 17

| Rheology Modifier | Total wt % | Stormer Initial/24 hrs [KU] | ICI |
|---|---|---|---|
| Natrosol ™ 250HBR | 0.5 | 106 | 0.77 P |
| Example 14 | 0.5 | 113 | 0.75 P |

Example 16—Synthesis of Poly(Vinylpyrrolidone/ MethacrylAmidoPropylTrimethylAmmonium Chloride (p(VP/MAPTAC))

548 g DI water, 101 g 1-vinyl-2-pyrrolidone (VP) and 90 g (MAPTAC)(50% active) were charged into a 1-L four necked resin kettle equipped with a thermocouple, condenser, oil bath and nitrogen purge. The mixture was stirred at 200 rpm. The reactor was purged with nitrogen and the polymerization was carried out under nitrogen. Bath temperature for water circulation was maintained at about 68° C. 0.21 g Trigonox® 25-C75 was charged and rinsed with 2 g DI water. The temperature was increased to about 63-66° C. and held for about 1 hour. 0.21 g Trigonox® 25-C75 was charged and rinsed with 2 g DI water. The mixture was stirred for about 3 hours. The final product obtained had:
Solids=20.31 wt %,
Solids weight Ratio of VP/MAPTAC=69/31,
Solids mole Ratio of VP/MAPTAC=82/18

Example 17—Poly(Vinylpyrrolidone/MethacrylAmidoPropylTrimethylAmmonium Chloride p(VP/MAPTAC) (made in Example 16) and Natrosol™ 250 HBR were added to 70PVC styrene acrylic paint (Table 2). The total active weight % of Example 16 and Natrosol™ 250 HBR was 0.5 wt, % of the paint with the ratio of Example 16 and Natrosol™ 250 HBR being 15:85. As a control only Natrosol™ 250 HBR was added to the paint at a concentration of 0.5 wt %. The comparative KU (Krebs Units) and ICI viscosity are given below in Table 18. ICI viscosity was the viscosity at a shear rate of 10,000 S$^{-1}$.

TABLE 18

| Rheology Modifier | Total wt % | Stormer Initial/24 hrs [KU] | ICI |
|---|---|---|---|
| Natrosol ™ 250HBR | 0.5 | 106 | 0.77 P |
| Example 16 | 0.5 | 109 | 0.77 P |

Example 18—Synthesis of Poly(Vinylpyrrolidone/MethacrylAmidoPropylTrimethylAmmonium Chloride (p(VP/MAPTAC))

548 g DI water, 73 g 1-vinyl-2-pyrrolidone (VP) and 146 g (MAPTAC) (50% active) were charged into a reactor of 1-L four necked resin kettle equipped with a thermocouple, condenser, oil bath and nitrogen purge. The mixture was stirred at 200 rpm. The reactor was purged with nitrogen and the polymerization was carried out under nitrogen. Bath temperature for water circulation was maintained at about 68° C. 0.21 g Trigonox® 25-C75 was charged and rinsed with 2 g DI water. The temperature was increased to about 63-66° C. and held for about 1 hour. 0.21 g Trigonox® 25-C75 was charged and rinsed with 2 g DI water. The mixture was stirred for about 3 hours. The final product obtained had:
Solids=20.26 wt %,
Solids weight Ratio of VP/MAPTAC=50/50,
Solids mole Ratio of VP/MAPTAC=67/33

Example 19—Poly(Vinylpyrrolidone/MethacrylAmidoPropylTrimethylAmmonium Chloride

P(VP/MAPTAC) (prepared in Example 18) and Natrosol™ 250 HBR were added to 70PVC styrene acrylic base paint (Table 2). The total active weight % of the P(VP/MAPTAC) and Natrosol™ 250 HBR was 0.5 wt, % of the paint with the ratio of P(VP/MAPTAC) and Natrosol™250 HBR being 15:85. As a control only Natrosol™ 250HBR was added to the paint at a concentration of 0.5 wt %. The comparative KU (Krebs Units) and ICI viscosity are given below in Table 19. ICI viscosity was the viscosity at a shear rate of 10,000 S$^{-1}$.

TABLE 19

| Rheology Modifier | Total wt % | Stormer Initial/24 hrs [KU] | ICI |
|---|---|---|---|
| Natrosol ™ 250HBR | 0.5 | 106 | 0.77 P |
| Example 18 | 0.5 | 112 | 0.75 P |

Example 20

An aqueous solution of the cationic copolymer of diallyl dimethyl ammonium chloride and acrylamide (Merquat™ 550, available from Lubrizol) and Natrosol™ 250 HBR were added to 70PVC styrene acrylic base paint (Table 2). The total active weight % of Merquat™ 550 and Natrosol™ 250 HBR was 0.4 wt, % of the paint with the ratio of Merquat™ 550 and Natrosol™ 250 HBR being 10:90. As a control only Natrosol™ 250 HBR was added to the paint at a concentration of 0.4 wt %. The comparative KU (Krebs Units) and ICI viscosity are given below in Table 20. ICI viscosity was the viscosity at a shear rate of 10,000 S$^{-1}$.

Example 21

Aqueous solutions of an amphoteric terpolymer of acrylic acid, methacrylamido-propyl trimethyl ammonium chloride (MAPTAC) and methylacrylate (MA) (Merquat™ 2001, available from Lubrizol) and hydroxyethyl cellulose (Natrosol™ 250 HBR) added to 70PVC styrene acrylic based paint (Table 2). The total active weight % of Merquat™ 2001 and Natrosol™250HBR was 0.4 wt, % of the paint with the ratio of Merquat™ 2001 and Natrosol™250HBR being 10:90. As a control only Natrosol™250HBR was added to the paint at a concentration of 0.4 wt %. The comparative KU (Krebs Units) and ICI viscosity are given below in Table 21. ICI viscosity was the viscosity at a shear rate of 10,000 S$^{-1}$.

TABLE 21

| Rheology Modifier | Total wt % | Stormer Initial/24 hrs [KU] | ICI |
|---|---|---|---|
| Natrosol ™ 250HBR | 0.4 | 94 | 0.6 P |
| Natrosol ™ 250HBR + Merquat ™ 2001 | 0.4 | 100 | 0.6 P |

Example 22

Aqueous solutions of an amphoteric terpolymer of methacrylamidopropyl trimethyl ammonium chloride (MAPTAC), acrylamide and acrylic acid (Merquat™ 2003PR, available from Lubrizol), and Natrosol™ 250 HBR were added to 70PVC styrene acrylic base paint (Table 2). The total active weight % of Merquat™ 2001 and Natrosol™ 250 HBR was 0.4 wt, % of the paint with the ratio of Merquat™ 2003PR and Natrosol™ 250 HBR being 10:90. As a control only Natrosol™ 250 HBR was added to the paint at a concentration of 0.4 wt %. The comparative KU (Krebs Units) and ICI viscosity are given below in Table 22. ICI viscosity was the viscosity at a shear rate of 10,000 S$^{-1}$.

TABLE 22

| Rheology Modifier | Total wt % | Stormer Initial/24 hrs [KU] | ICI |
|---|---|---|---|
| Natrosol ™ 250HBR | 0.4 | 94 | 0.6 P |
| Natrosol ™ 250HBR + Merquat ™ 2003PR | 0.4 | 103 | 0.7 P |

What is claimed is:
1. A rheology modifier composition, comprising:
(a) about 50 to about 90% by weight of a water soluble polymer, wherein the water soluble polymer is a cellulose ether selected from the group consisting of hydroxyethyl cellulose, hydrophobically modified hydroxyethyl cellulose, and methylhydroxyethyl cellulose, and wherein the cellulose ether is a cross-linked cellulose ether;
(b) about 10 to about 50% by weight of a cationic polymer, wherein the cationic polymer is produced by polymerizing a quaternized monomer, further wherein the cationic polymer is selected from the group consisting of acrylamidopropyl trimonium chloride and acrylamidopropyl trimonium chloride/acrylamide copolymer; and
(c) a dispersant selected from the group consisting of polycarboxylic acids, carboxylated polyelectrolyte salts, tripolyphosphate salts and tetrapotassium pyrophosphate, ethoxylated fatty alcohols, amino alcohols, acrylic copolymers, naphthalene sulfonic acid-formaldehyde adducts, sulfonated fatty acids, and combinations thereof.

2. The rheology modifier composition of claim 1, wherein the quaternized monomer has the formula (I):

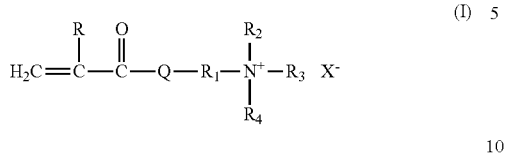

wherein R is hydrogen or methyl, Q is NH or O, $R_1$ is alkyl $C_2$-$C_6$, $R_2$-$R_4$ are each individually alkyl $C_1$-$C_6$, and X is a halogen or sulfonate.

3. The rheology modifier composition of claim 1, wherein the quaternized monomer has the formula (II):

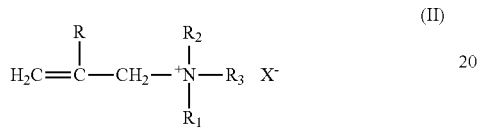

wherein R is hydrogen or alkyl $C_1$-$C_6$, $R_1$ is hydrogen, alkyl $C_1$-$C_6$, allyl or aryl; $R_2$ and $R_3$ are individually hydrogen, alky $C_1$-$C_6$, allyl or aryl; and X is halogen or sulfonate.

4. The rheology modifier composition of claim 3, wherein the quaternized monomer is diallyldialkylammonium salt.

5. The rheology modifier composition of claim 1, wherein the quaternized monomer has the formula (III):

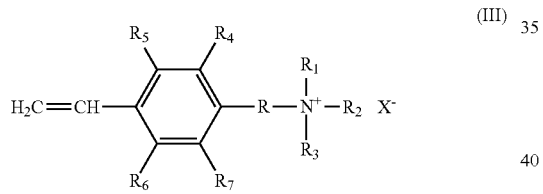

wherein R is alkyl $C_1$-$C_6$, $R_1$-$R_3$ are each individually alkyl $C_1$-$C_8$, $R_4$-$R_7$ are each individually hydrogen or alkyl $C_1$-$C_6$, and X is halogen or sulfonate.

6. The rheology modifier composition of claim 5, wherein the quaternized monomer is vinylbenzyl ammonium salt.

7. The rheology modifier composition of claim 1, wherein the quaternized monomer has the formula (IV):

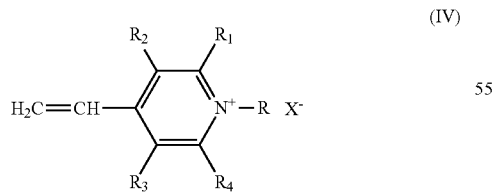

wherein R is alkyl $C_1$-$C_6$, $R_1$-$R_4$ are each individually hydrogen or alkyl $C_1$-$C_6$, and X is halogen or sulfonate.

8. The rheology modifier composition of claim 7, wherein the quaternized monomer is selected from the group consisting of 1-ethyl-4-vinylpyridinium chloride, 1-ethyl-4-vinylpyridinium bromide, and 1-ethyl-4-vinylpyridinium methyl sulfonate.

9. The rheology modifier composition of claim 1, wherein the quaternized monomer has the formula (V):

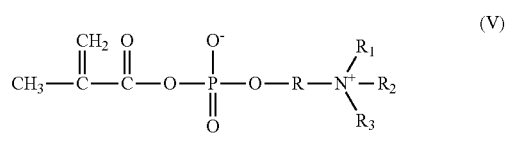

wherein R is alkyl $C_1$-$C_6$, and $R_1$-$R_3$ are each individually alkyl $C_1$-$C_4$.

10. The rheology modifier composition of claim 1, wherein the quaternized monomer has the formula (VI):

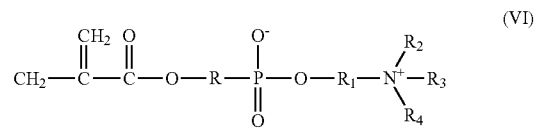

wherein R and $R_1$ are each individually alkyl $C_2$-$C_6$, and $R_2$-$R_4$ are each individually alkyl $C_1$-$C_6$.

11. The rheology modifier composition of claim 10, wherein the quaternized monomer is polyquaternium 51, polyquaternium 61 and polyquaternium 64.

12. The rheology modifier composition of claim 1, wherein the quaternized monomer has the formula (VII):

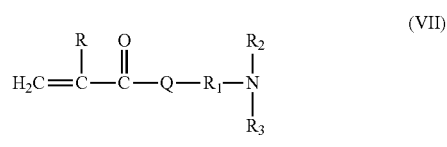

wherein R is hydrogen or methyl, Q is NH or O, $R_1$ is alkyl $C_2$-$C_6$, and $R_2$ and $R_3$ are each individually alkyl $C_1$-$C_6$.

13. The rheology modifier composition of claim 12, wherein the quaternized monomer is dimethylaminopropyl methacrylamide and dimethylaminoethyl methacrylamide.

14. The rheology modifier composition of claim 1, wherein the quaternized monomer has the formula (VIII):

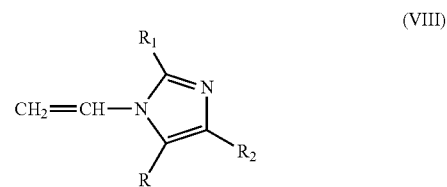

wherein R, $R_1$, and $R_2$ are each individually hydrogen or alkyl $C_1$-$C_6$.

15. The rheology modifier composition of claim 14, wherein the quaternized monomer is 1-vinylimidazole.

16. The rheology modifier composition of claim 1, wherein the quaternized monomer has the formula (IX):

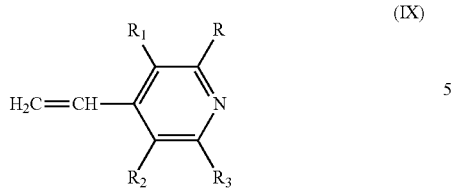 (IX)
wherein R, R$_1$, R$_2$ and R$_3$ are each individually hydrogen or alkyl C$_1$-C$_6$.
17. The rheology modifier composition of claim 16, wherein the quaternized monomer is 4-viylpyridine.
18. The rheology modifier composition of claim 1, wherein the cross-linker comprises glyoxal.
* * * * *